US011524259B2

(12) United States Patent
Dekoninck (10) Patent No.: US 11,524,259 B2
(45) Date of Patent: Dec. 13, 2022

(54) APPARATUS FOR PRODUCING LIQUID WATER FROM AMBIENT AIR BY ADSORPTION AT NIGHT AND DESORPTION DURING THE DAY

(71) Applicant: Philippe Dekoninck, Villemoirieu (FR)

(72) Inventor: Philippe Dekoninck, Villemoirieu (FR)

(73) Assignee: Agua de Sol, Bourg-en-Bresse (FR)

( * ) Notice: Subject to any disclaimer, the term of this patent is extended or adjusted under 35 U.S.C. 154(b) by 344 days.

(21) Appl. No.: 16/961,898

(22) PCT Filed: Jan. 10, 2019

(86) PCT No.: PCT/FR2019/050053
§ 371 (c)(1),
(2) Date: Jul. 13, 2020

(87) PCT Pub. No.: WO2019/141923
PCT Pub. Date: Jul. 25, 2019

(65) Prior Publication Data
US 2020/0384408 A1    Dec. 10, 2020

(30) Foreign Application Priority Data
Jan. 22, 2018    (FR) ..................... 18 50477

(51) Int. Cl.
*E03B 3/28*       (2006.01)
*B01D 53/26*      (2006.01)
*B01D 53/04*      (2006.01)

(52) U.S. Cl.
CPC ....... *B01D 53/261* (2013.01); *B01D 53/0438* (2013.01); *B01D 53/0446* (2013.01);
(Continued)

(58) Field of Classification Search
CPC  B01D 53/04; B01D 53/0438; B01D 53/0446; B01D 53/261; B01D 2253/102;
(Continued)

(56) References Cited

U.S. PATENT DOCUMENTS

| 4,146,372 A | 3/1979 | Groth et al. |
| 4,285,702 A * | 8/1981 | Michel ................ F24S 23/77 96/111 |

(Continued)

FOREIGN PATENT DOCUMENTS

| DE | 3431186 A1 | 3/1986 |
| FR | 2473489 A1 | 7/1981 |
| FR | 3044003 A1 | 5/2017 |

*Primary Examiner* — Frank M Lawrence, Jr.
(74) *Attorney, Agent, or Firm* — Craft Chu PLLC; Andrew W. Chu (57) ABSTRACT

The apparatus for producing liquid water from ambient air includes a lower frame and an upper cover defining an inner space, and at least one air inlet in the lower frame. An adsorption and desorption module is arranged in the inner space with a bed of adsorbent material. A ventilator varies between a first mode in which it imposes vertical forced circulation of the ambient air, and a second mode in which the upper cover acts as a condenser for the ambient air. A valve is arranged in the upper cover to allow the ambient air to flow from the inner space to the outside environment when the ventilator is in the first mode, the valve being otherwise closed. An electronic unit switches the ventilator selectively into the first mode during a period of night time and into the second mode during a period of day time.

11 Claims, 5 Drawing Sheets

(52) U.S. Cl.
CPC .......... *E03B 3/28* (2013.01); *B01D 2253/102* (2013.01); *B01D 2253/104* (2013.01); *B01D 2253/108* (2013.01); *B01D 2257/80* (2013.01); *B01D 2259/40098* (2013.01)

(58) Field of Classification Search
CPC ........ B01D 2253/104; B01D 2253/108; B01D 2257/80; B01D 2259/40098; E03B 3/28; Y02A 20/00
USPC ............. 95/117, 121, 126, 148; 96/143, 146
See application file for complete search history.

(56) References Cited

U.S. PATENT DOCUMENTS

| | | | | |
|---|---|---|---|---|
| 5,846,296 | A * | 12/1998 | Krumsvik | B01D 5/0066 95/126 |
| 7,467,523 | B2 * | 12/2008 | Vetrovec | C02F 1/14 96/108 |
| 8,506,764 | B2 * | 8/2013 | Chevrette | B01D 5/0018 202/185.1 |
| 2009/0173376 | A1 * | 7/2009 | Spencer | F24S 40/42 126/569 |
| 2011/0088552 | A1 * | 4/2011 | Ike | B01D 53/261 96/123 |
| 2012/0204725 | A1 | 8/2012 | Goelet et al. | |

* cited by examiner

APPARATUS FOR PRODUCING LIQUID WATER FROM AMBIENT AIR BY ADSORPTION AT NIGHT AND DESORPTION DURING THE DAY

CROSS-REFERENCE TO RELATED APPLICATIONS

See Application Data Sheet.

STATEMENT REGARDING FEDERALLY SPONSORED RESEARCH OR DEVELOPMENT

Not applicable.

The Names of Parties to a Joint Research Agreement

Not applicable.

Incorporation-by-Reference of Material Submitted on a Compact

Disc or as a Text File Via the Office Electronic Filing System (EFS-WEB)

Not applicable.

Statement Regarding Prior Disclosures by the Inventor or a Joint

Inventor

Not applicable.

BACKGROUND OF THE INVENTION

1. Field of the Invention

The present invention relates to an apparatus capable of producing liquid water from atmospheric air by using an adsorbent material.

2. Description of Related Art Including Information Disclosed Under 37 CFR 1.97 and 37 CFR 1.98

It has already been imagined to obtain liquid water from atmospheric air, by alternately taking advantage of the fact that the air is cool at night to dehumidify it by adsorption and that it is possible to use the sun's rays during the day to extract, by desorption, the water extracted from the air during the night and stored in the absorbent material.

However, the solutions known at this time are extremely complex, consume large amounts of energy and are very expensive, which makes them prohibitive most of the time for the target markets.

BRIEF SUMMARY OF THE INVENTION

The present invention aims to address all or some of the aforementioned drawbacks.

In this context, one aim is to provide an apparatus of the aforementioned type that is effective and robust while satisfying at least one of the following objectives:
being cost-effective,
having a simple design and being easy to use,
being energy-efficient.

This aim can be achieved owing to the provision of an apparatus for producing liquid water from atmospheric air, said apparatus comprising a lower frame and an upper cover attached on the lower frame, delimiting an inner volume between them, all or part of the upper cover being formed from a material at least partially transparent to an incident outer solar flux on the upper cover so as to allow an inner solar flux to enter the inner volume, said apparatus further comprising:

at least one air inlet arranged in the lower frame allowing the intake, in the inner volume, of atmospheric air coming from the environment outside the inner volume, at least one adsorption and desorption module arranged in the inner volume above the air inlet and comprising, on the one hand, a bed of adsorbent material suitable for the adsorption and desorption of water molecules with respect to the atmospheric air in contact with the adsorbent material, on the other hand solar capture elements generating calories from the inner solar flux and thermally transferring the generated calories to the adsorbent material, at least one fan able to vary between an operating mode in which the fan imposes a forced vertical circulation from bottom to top of the atmospheric air admitted through the air inlet where said forced circulation requires the atmospheric air to pass through the bed of adsorbent material and the solar capture elements, and a non-operating mode in which the upper cover plays a capacitor role for the atmospheric air in the inner volume, at least one valve arranged in the upper cover to make it possible, when the fan is in the operating mode, to allow atmospheric air to go from the inner volume to the outside environment, the valve being closed when the fan is in the non-operating mode, an electronic control unit of the fan intended to place the fan, depending on predetermined criteria known by the electronic control unit, selectively in the operating mode during a nighttime period and in the nonoperating mode during a daytime period, at least one trough making it possible to collect the liquid water that condenses on the upper cover from the atmospheric air in the inner volume during the daytime period.

The apparatus can also satisfy the technical features below, considered alone or in combination.

The passage section for the atmospheric air passing through the bed of adsorbent material in the operating mode of the fan corresponds to the entire surface of the solar capture elements passed through by the atmospheric air.

The solar capture elements are in direct contact with the adsorbent material.

The valve works solely by pressure differential between the pressure of the atmospheric air in the inner volume and the pressure of the atmospheric air in the outside environment.

The upper cover is formed so as to ensure a gravitational flow of the condensed water to the trough.

The upper cover comprises at least one planar wall that is inclined relative to the vertical and relative to the horizontal.

Each absorption and desorption module comprises a substantially planar support mounted on the lower frame and arranged like an open-worked grating making it possible both to support the absorbent material and to allow the forced circulation of atmospheric air through the support.

The solar capture elements are made up of inclined walls coming from the extension of inner partitions of the grating and in a heat exchange situation by thermal conduction with the inner partitions of the grating.

The apparatus comprises at least two independent absorption and desorption modules placed below a same upper cover.

The apparatus comprises a power supply source designed to supply the fan with electricity, the power supply source comprising elements for connecting the apparatus and/or elements to an outside electrical grid in order to produce electricity.

The predetermined criteria based on which the electronic control unit places the fan in the operating mode and in the non-operating mode comprise a first time value from which the fan is placed in the operating mode and a second time value from which the fan is placed in a non-operating mode and the electronic control unit comprises an internal clock.

The solar capture elements comprise a substantially planar support mounted on the lower frame and formed by the assembly of a plurality of hollow beams relative to one another, where all or some of the inner volume of said hollow beams is filled by the absorbent material, each hollow beam being perforated to allow the forced circulation of the atmospheric air through the inner volume of said hollow beams.

The support is oriented spatially so as to form an angle with the horizontal of between 5 and 60°.

BRIEF DESCRIPTION OF THE SEVERAL VIEWS OF THE DRAWINGS

The invention will be better understood using the following description of specific embodiments of the invention, provided as non-limiting examples and shown in the appended drawings.

DETAILED DESCRIPTION OF THE INVENTION

In reference to FIGS. 1 to 14 appended hereto as described briefly above, the invention essentially relates to an apparatus 10 able to produce liquid water from atmospheric air, by appropriately using an adsorbent material. More specifically, in general, the apparatus 10 performs an adsorption of water molecules from the atmospheric air that it contains when the air is coolest, that is to say, during a given time period at night, then, during a given time period during the day, the apparatus 10 on the one hand performing a desorption of these previously adsorbed water molecules, by simple heating of the adsorbent material only by greenhouse effect and solar heating, on the other hand a condensation of the water molecules previously released by desorption and a recovery of the water molecules previously condensed.

To that end, the apparatus 10 comprises a lower frame 11 and an upper cover 12 attached on the lower frame 11, delimiting an inner volume 13 between them. All or part of the upper cover 12 is advantageously formed from a material that is at least partially transparent to an incident outer solar flux on the upper cover 12 so as to allow an inner solar flux to enter the inner volume 13. To that end, all or some of the walls making up the upper cover 12 are for example made up of glass or a plastic material that is transparent or translucent to the solar light, for example polycarbonate. The use of glass is advantageous for its transparency and water absorbency properties.

The apparatus 10 also comprises at least one air inlet 14 arranged in the lower frame 11 allowing the intake, in the inner volume 13, of atmospheric air coming from the environment outside the inner volume 13. In particular, as shown, it is advantageous to provide that the air inlet 14 is arranged through the lower face of the lower frame 11, which then rests on the ground by means of feet 15 placing a gap between the lower face of the lower frame 11 and the ground.

The apparatus 10 also comprises at least one adsorption and desorption module 16 arranged in the inner volume 13 above the air inlet 14 and comprising, on the one hand, a bed of adsorbent material 17 suitable for the adsorption and desorption of water molecules with respect to the atmospheric air in contact with the adsorbent material 17, on the other hand solar capture elements 18 generating calories from the inner solar flux and thermally transferring the generated calories to the adsorbent material 17.

The adsorbent material 17 in this document corresponds to an adsorbent material having an affinity for steam. As an example, the adsorbent material can be a silica gel that has a high performance level in the application concerned by the invention. Otherwise, it can be an activated alumina, different types of molecular sieves also called zeolites or different types of activated carbons.

The apparatus 10 also comprises at least one fan 21 able to vary between:

an operating mode in which the fan 21 imposes a forced vertical circulation from bottom to top of the atmospheric air admitted through the air inlet 14 where this forced circulation requires the atmospheric air to pass through the bed of adsorbent material 17 and the solar capture elements 18, and a non-operating mode in which the upper cover 12 plays a capacitor role for the atmospheric air in the inner volume 13.

Each air inlet 14 is equipped with an air filter capable of filtering the atmospheric air that is allowed into the inner volume 13 for impurities upstream from the corresponding fan 21.

The apparatus 10 also comprises at least one valve 22 arranged in the upper cover 12 to make it possible, when the fan 21 is in the operating mode, to allow atmospheric air to go from the inner volume 13 to the outside environment, the valve 22 being closed when the fan 21 is in the non-operating mode.

Preferably, for reasons related to the simplicity of the design and ease of use, as well as cost, but without in any way altering the operation of the apparatus 10, the valve 22 works solely by pressure differential between the pressure of the atmospheric air in the inner volume 13 and the pressure of the atmospheric air in the outside environment.

Furthermore, the apparatus 10 comprises an electronic control unit (not shown) controlling the fan 21. In particular, the electronic control unit, which can be positioned in the lower frame 11, is intended to place the fan 21 selectively in the operating mode during a nighttime period and in the nonoperating mode during a daytime period, depending on predetermined criteria known by the electronic control unit.

In other words, one operating method of the apparatus 10 is to provide a step carried out during the nighttime period in which the fan 21 operates, then a step carried out during the daytime period during which the fan 21 does not operate. When the fan 21 operates during the nighttime period, it imposes a forced circulation of the atmospheric air allowed through the inlet 14 through the bed of adsorbent material 17, which becomes effectively charged by adsorption of water molecules taken from the air flux passing through due to the fact that this air is cooler during the nighttime period. The presence of the fan 21 during the adsorption phase makes it possible to optimize the charging with steam. The bed of adsorbent material 17 advantageously has a small thickness, typically between 0.5 and 10 centimeters, so as to limit the head loss of an atmospheric air flow passing through to several millibars, which allows the use of a fan 21 of the axial type, which is advantageously economical in terms of electrical energy (power conventionally limited to several Watts per m2). At the same time, the atmospheric air that has passed through the adsorption and desorption module 16 is discharged automatically via the valve 22 toward the outside, which has the additional advantage of discharging the heat given off by adsorption phenomenon of the adsorbent material 17 toward the outside of the apparatus 10.

When the fan 21 is not operating in the daytime period, the inner solar flux that results from the at least partial transparency of the upper cover 12 with respect to the incident outer solar flux causes a greenhouse effect for the atmospheric air contained in the inner volume 13 whereof the heating participates in the desorption of the water molecules from the adsorbent material 17. This desorption is also favored by the action of the calories transmitted by the solar capture elements 18 after having been generated by capture from the inner solar flux. After desorption, the steam condenses naturally on the inner walls of the upper cover 12.

In general, it is also specified that the upper cover 12 advantageously has a triple function: providing the greenhouse effect during the non-operating mode of the fan 21, providing the condensation of the desorbed steam owing to the heat exchange with the atmospheric air to the outside of the inner volume 13, and also providing a sterilization of the condenser owing to the UV radiation of the solar flux that passes through the upper cover 12.

The apparatus 10 also comprises at least one trough 23 collecting the liquid water that condenses on the upper cover 12 from the atmospheric air in the inner volume 13 during the daytime period. As shown in the Figures, the trough 23 is delimited by the lower frame 11, although it could indifferently be delimited or borne by the upper cover 12. Preferably, the trough 23 is arranged so as to have a slight slope relative to the horizontal so as to allow a good gravitational flow along the trough 23 of the collected water to a low point potentially equipped by a flow tube 24 allowing the water to flow toward the outside of the inner volume 13.

It emerges from the preceding that the apparatus 10 is cost-effective, has a simple design, is easy to use and is energy-efficient. It does not require any manual or motorized actuator other than the fan 21 during the entire cycle consisting of the successive implementation of the operating mode, then the nonoperating mode of the fan 21. The automation necessary for the operation of the apparatus 10 can be reduced to the on command of the fan 21 at the beginning of the absorption phase and the off command of the fan 21 at the end of this phase. However, the fan 21 is not used during the phase for heating of the adsorbent material 17 and desorption, then condensation. The steam, heated and therefore lighter, rises from the bed of adsorbent material 17 to the upper cover 12, which then serves as condenser.

The apparatus 10 comprises an electrical power source (not shown) intended to supply the fan 21 with electricity, preferably at a lower voltage level, typically 12 V or 24 V. The electrical power source comprises elements for connecting to a power grid outside the apparatus 10 and/or elements for producing electricity, for example photovoltaic panels or wind power production elements. The electrical power source can optionally include a battery for storing electrical energy, whether this energy comes from the power grid or is produced in situ.

According to one non-limiting embodiment, the predetermined criteria based on which the electronic control unit places the fan 21 in the operating mode and in the non-operating mode comprise a first time value from which the fan 21 is placed in the operating mode and a second time value from which the fan 21 is placed in a non-operating mode. The electronic control unit then comprises an internal clock. Indeed, it may be necessary to wait until late at night for the relative humidity in the air to increase significantly: the determination and entry of the first and second time values make it possible to account for these weather conditions. The predetermined criteria could also comprise minimum and maximum relative humidity values.

Advantageously, the passage section for the atmospheric air passing through the bed of adsorbent material 17 in the operating mode of the fan 21 corresponds to the entire surface of the solar capture elements 18 passed through by the atmospheric air. This reinforces the possibility of using a smaller thickness of the bed of adsorbent material 17.

According to one particularly advantageous embodiment for the implementation of the description when the fan 21 is placed in the nonoperating mode, the solar capture elements 18 are in direct contact with the absorbent material 17.

According to one specific, but non-limiting embodiment, each absorption and desorption module 16 comprises a substantially planar support 19 mounted on the lower frame 11 and arranged like an open-worked grating making it possible both to support the absorbent material 17 and to allow the forced circulation of atmospheric air through the support 19. Such a grating comprises a first series of inner partitions 20 that are all parallel to one another and a second series of inner partitions 20 that are all parallel to one another but oriented transversely relative to the inner partitions 20 of the first series.

Advantageously, for reasons of simplicity and high efficiency of the desorption, the solar capture elements 18 are made up of inclined walls coming from the extension of inner partitions 20 of the grating and in a heat exchange situation by thermal conduction with the inner partitions 20 of the grating. The contact surface between the adsorbent material 17 and the solar capture elements 18 is thus maximized. The incline of these inclined walls aims to improve the solar capture from the inner solar flux, which in turn is inclined relative to the vertical.

The way in which the support 19 and the component inclined walls of the solar capture element 18 are organized is not limiting in itself. As an example, it is possible to form the support 19 by providing a first part in the form of a flat grid mounted horizontally in the lower frame 11 and a second part embodying both the first and the second series of inner partitions 20, but also the inclined walls making up the solar capture elements 18. Alternatively, in reference to FIG. 7, it is possible to form the support 19 and the solar capture elements 18 in a one-piece part, the grating delimiting, in the lower part, a horizontal extension pierced with holes to allow the passage of the atmospheric air and to support the adsorbent material 17. Aside from the ease of manufacturing, this last variant has the advantage of increasing the contact surface between the adsorbent material 17 and the solar capture elements 18.

Advantageously, the upper cover 12 is formed so as to ensure a gravitational flow, in particular without loss, of the condensed water to the trough 23. Once again, this principle makes it possible to make the apparatus 10 autonomous and not requiring any actuator other than the fan 21.

To that end, the upper cover 12 comprises at least one planar wall that is inclined relative to the vertical and relative to the horizontal. For example, as is the case in each of the two embodiments respectively shown in FIG. 1 and FIG. 6, the upper cover 12 comprises at least two such inclined planar walls, for example each by an angle of about 45 degrees relative to the vertical, so as to converge toward an apical part of the upper cover 12.

Figure 1:
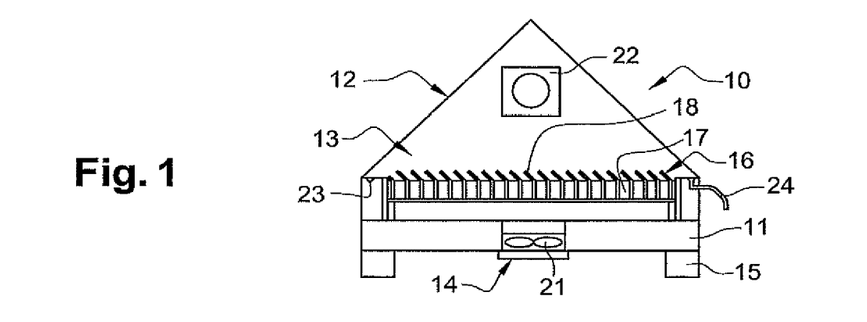
FIG. 1 is a front elevation view of a first embodiment of an apparatus according to the invention.
Figure 2:
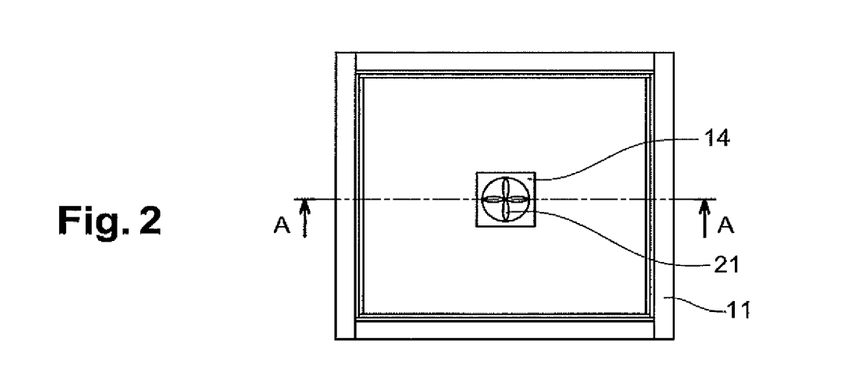
FIG. 2 is a sectional view of the apparatus of FIG. 1 along the section plane B-B identified in FIG. 3.
Figure 3:
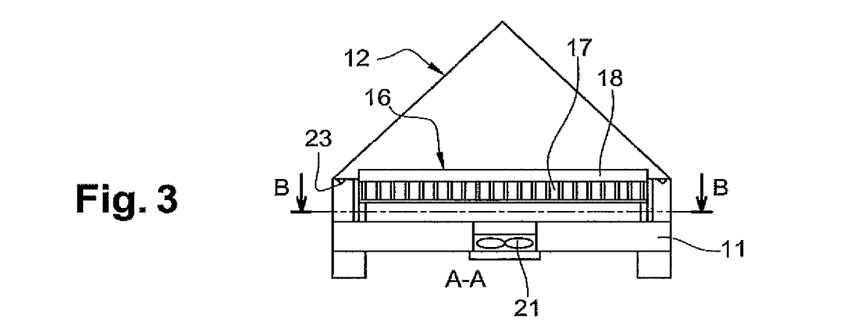
FIG. 3 is a section view of the apparatus of the preceding Figures along the section plane A-A identified in FIG. 2.
Figure 4:
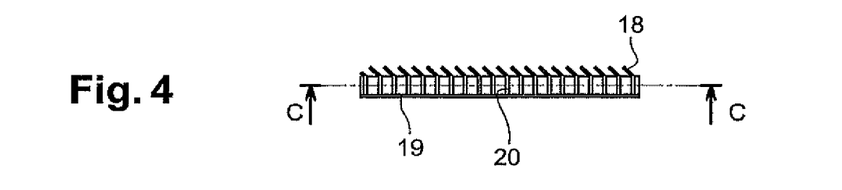
FIG. 4 is a front elevation view of the adsorption and desorption module used in the apparatus of FIGS. 1 to 3, without the adsorbent material.
Figure 5:
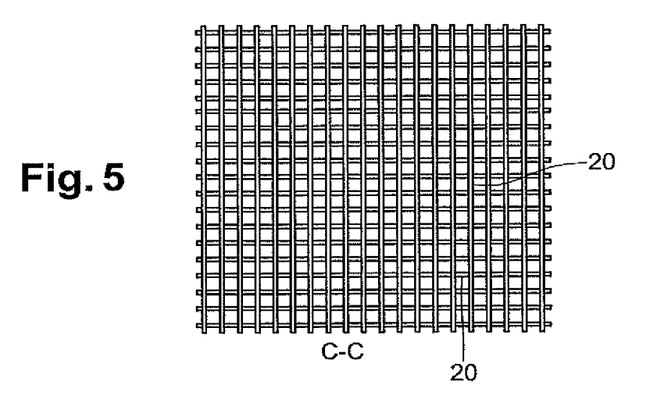
FIG. 5 is a sectional view of the adsorption and desorption module of FIG. 4, without the adsorbent material, along the section plane C-C shown in FIG. 4.
Figure 6:
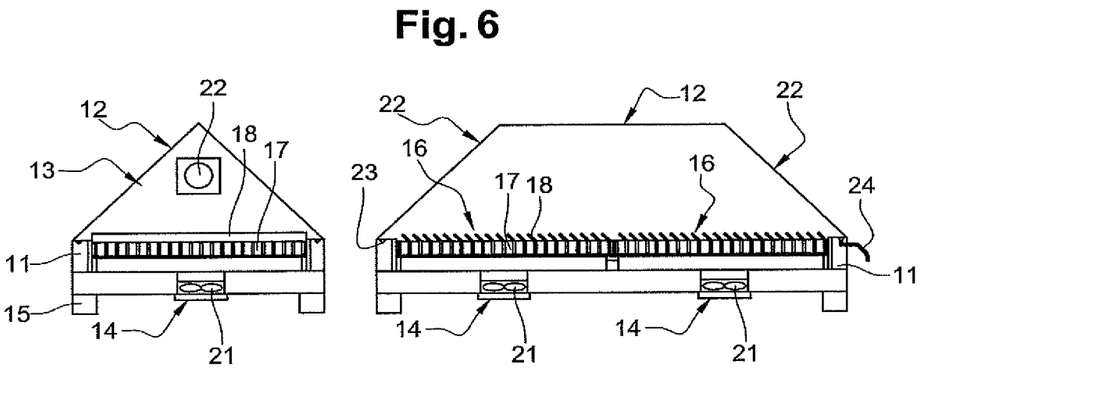
FIG. 6 shows, in front elevation and side elevation view, a second embodiment of an apparatus according to the invention.
Figure 7:
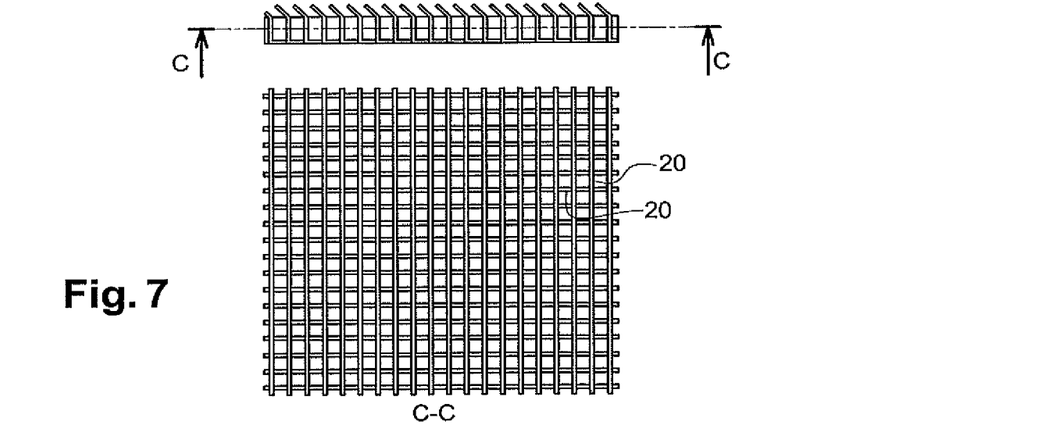
FIG. 7 shows, in front sectional view and along the section plane C-C, a variant adsorption and desorption module, without the adsorbent material.

This does not exclude the implementation of the second embodiment of FIG. 6, where, unlike the configuration of the first embodiment of FIGS. 1 to 5 where the apparatus 10 only comprises a single adsorption and desorption module 16 below a single and same upper cover 12, the apparatus 10 comprises at least two independent adsorption and desorption modules 16 placed below a same upper cover 12. It is then preferably provided to arrange an air inlet 14 and a fan 21 for each of the adsorption and desorption modules 16, allowing a selective and individual operation of each of the modules 16. This second embodiment is equipped with two valves 22 as previously described in connection with the first embodiment, arranged in walls of the upper cover 12 opposite one another.

FIGS. 8 to 14 illustrate variants in how the adsorption and desorption module(s) 16 are structured. In the third embodiment of FIGS. 8 and 9, in the fourth embodiment of FIGS. 10 and 11 and in the fifth embodiment of FIGS. 12 to 14, it is provided that, for each adsorption and desorption module 16, the solar capture elements 18 comprise a substantially planar support 25 mounted on the lower frame 11 and formed by the assembly of a plurality of hollow beams 26 relative to one another, where all or some of the inner volume of said hollow beams 26 is filled by the absorbent material 17, each hollow beam 26 being perforated to allow the forced circulation of the atmospheric air through the inner volume of the hollow beams 26.

The use of such hollow beams 26 can prove advantageous for modules 16 having a large surface area, able to allow a range exceeding 1 meter, given the inherent stiffness of each hollow beam 26. In the state assembled to one another, the beams 26 impart a good mechanical stiffness to the module 16.

Each hollow beam 26 is formed in a light material, conducting heat well and withstanding corrosion, for example aluminum. The use of aluminum makes it possible to conduct heat efficiently over the entire surface of the module 16 (the adsorbent material 17 generally not conducting heat well) and to conduct the heat in all of the adsorbent material 17 within each hollow beam 26. The mechanical contact between the different hollow beams 26 makes it possible to guarantee a good heat transfer from one beam to another.

Each hollow beam 26 includes, at least on its upper and lower faces, a plurality of perforations that make it possible to allow the atmospheric air to pass through the adsorbent material 17. The dimensions of the perforations are strictly smaller than the dimensions of the particles of adsorbent material 17 used.

Figure 8:
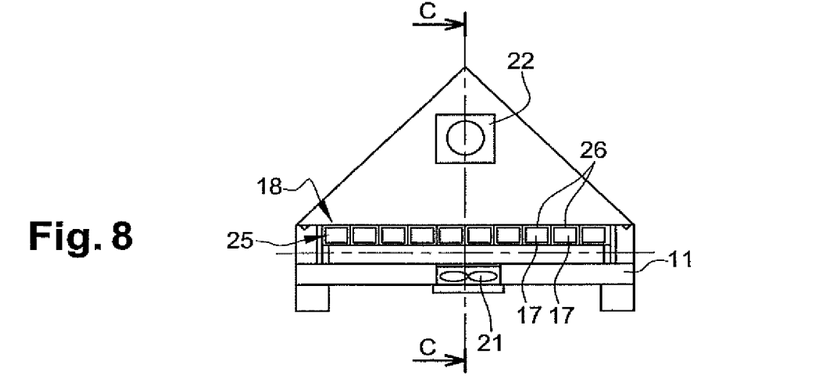
FIG. 8 is a front elevation view of a third embodiment of an apparatus according to the invention.
Figure 9:
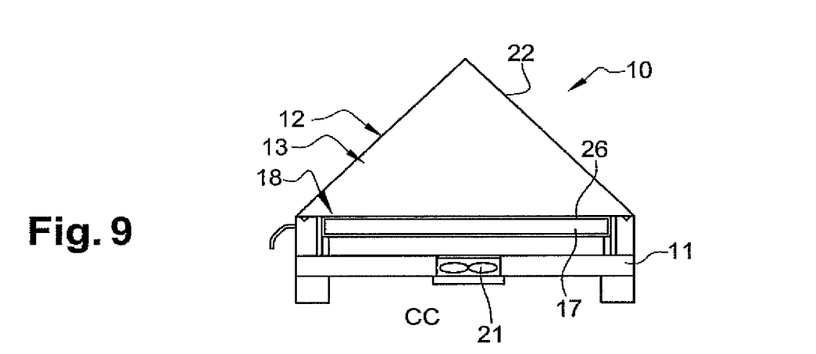
FIG. 9 is a sectional view of the apparatus of FIG. 8 along the section plane C-C identified in FIG. 8.
Figure 10:
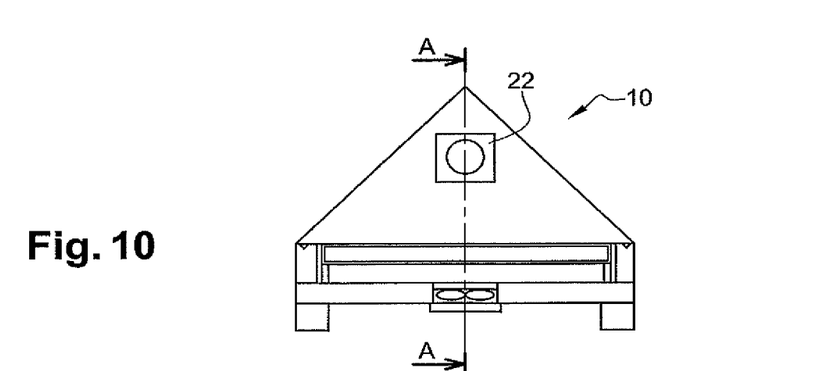
FIG. 10 is a front elevation view of a fourth embodiment of an apparatus according to the invention.
Figure 11:
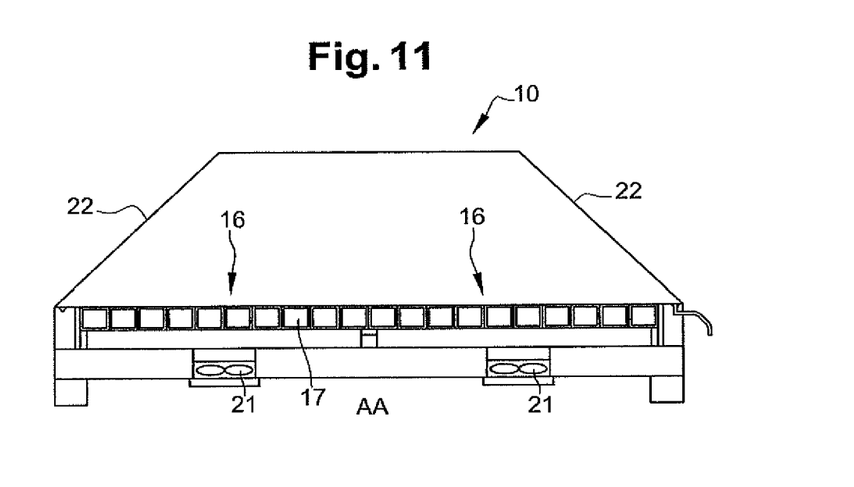
FIG. 11 is a sectional view of the apparatus of FIG. 10 along the section plane A-A identified in FIG. 10.

In the third embodiment of FIGS. 8 and 9, the organization of the upper cover 12 is equivalent to that of the one used in the first embodiment of FIGS. 1 to 5, namely a pyramidal organization with walls. Like the general organization of the second embodiment of FIGS. 6 and 7, the apparatus 10 according to the fourth embodiment of FIGS. 10 and 11 provides for the presence of two independent adsorption and desorption modules 16 placed under a single and same upper cover 12 with four walls. An air inlet 14 and a fan 21 are provided for each of the two adsorption and desorption modules 16, allowing a selective and individual operation of each of the modules 16. The apparatus 10 comprises two valves 22 arranged in walls of the upper cover 12 opposite one another.

Figure 12:
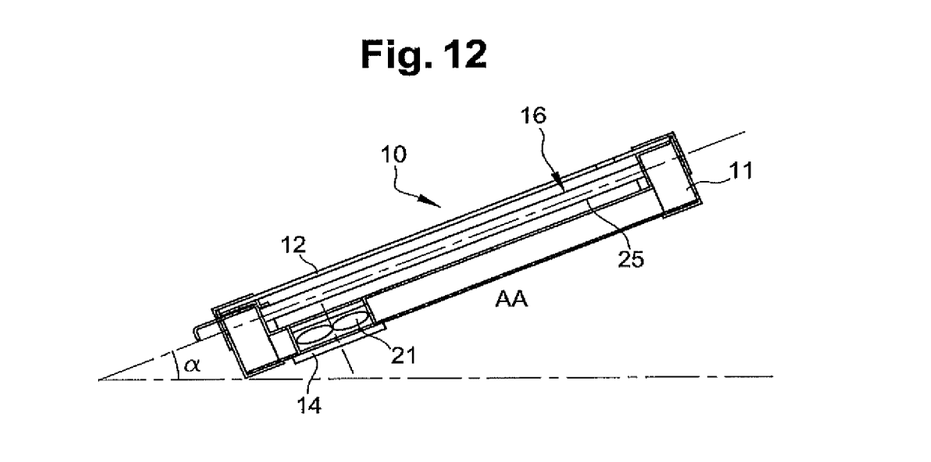
FIG. 12 is a sectional view of a fifth embodiment of an apparatus according to the invention, along the section plane A-A shown in FIG. 14.
Figure 13:
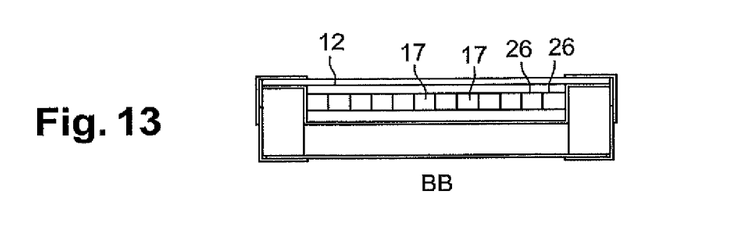
FIG. 13 is a sectional view of the apparatus of FIG. 12 along the section plane B-B identified in FIG. 14.
Figure 14:
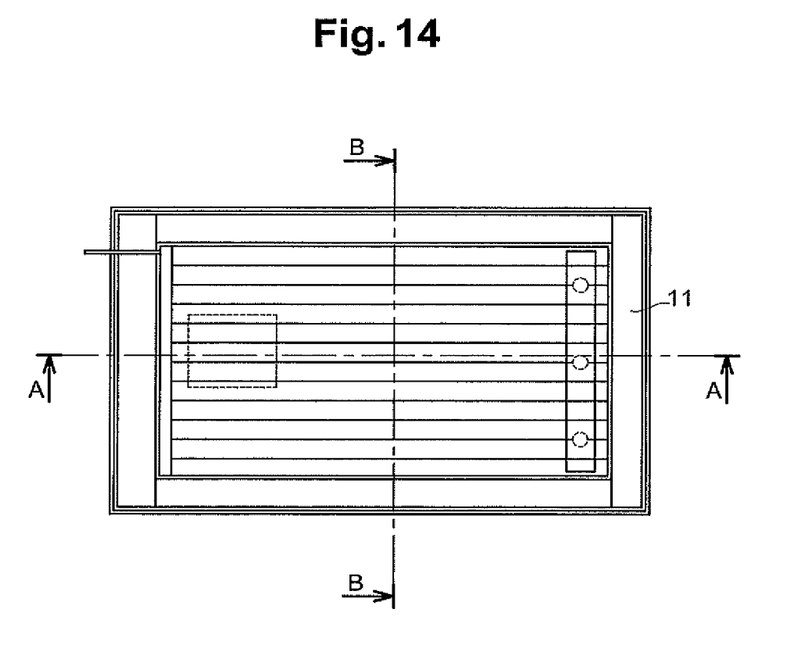
FIG. 14 shows top plan view of the fifth embodiment visible in FIGS. 12 and 13.

The apparatus 10 according to FIGS. 12 to 14 differs from that of FIGS. 8 to 11 by the fact that the support 25 is oriented spatially so as to form an angle "A" with the horizontal of between 5 and 60°. This incline relative to the plane of the horizontal, subject to a suitable orientation toward the south, favors the incidence of the external solar flux and the solar capture. The upper cover 12 is made up of a single wall unlike the other embodiments, which allows the gravitational flow of the condensed water due to the fact that this wall is inclined in the same way as the support 25. The presence of such an upper cover 12 makes it possible to favor the simplicity and manufacturing cost, without detriment to the efficiency. The fan 21 is off-centered relative to the center of the apparatus 10 so as to be placed in the lower part of the apparatus 10 despite its incline by the angle A, the steam rising on its own up to the valve 22 that is in turn located in the upper part of the apparatus 10.

Of course, the invention is not limited to the embodiments shown and described above, but on the contrary covers all variants.

I claim:

1. An apparatus for producing liquid water from atmospheric air, said apparatus comprising:
   a lower frame,
   an upper cover attached on the lower frame, delimiting an inner volume between them, all or part of the upper cover being formed from a material at least partially transparent to an incident outer solar flux on the upper cover so as to allow an inner solar flux to enter the inner volume, at least one air inlet arranged in the lower frame allowing an intake, in the inner volume, of atmospheric air coming from the environment outside the inner volume, at least one adsorption and desorption module arranged in the inner volume above the air inlet and comprising a bed of adsorbent material suitable for the adsorption and desorption of water molecules with respect to the atmospheric air in contact with the adsorbent material, and solar capture elements generating calories from the inner solar flux and thermally transferring the generated calories to the adsorbent material, at least one fan able to vary between an operating mode in which the fan imposes a forced vertical circulation from bottom to top of the atmospheric air admitted through the air inlet where said forced circulation requires the atmospheric air to pass through the bed of adsorbent material and the solar capture elements, and a non-operating mode in which the upper cover plays a capacitor role for the atmospheric air in the inner volume, at least one valve arranged in the upper cover to make it possible, when the fan is in the operating mode, to allow atmospheric air to go from the inner volume to the outside environment, the valve being closed when the fan is in the non-operating mode, an electronic control unit of the fan intended to place the fan, depending on predetermined criteria known by the electronic control unit, selectively in the operating mode during a nighttime period and in the nonoperating mode during a daytime period, and at least one trough making it possible to collect the liquid water that condenses on the upper cover from the atmospheric air in the inner volume during the daytime period.

2. The apparatus according to claim 1, wherein a passage section for the atmospheric air passing through the bed of adsorbent material in the operating mode of the fan corresponds to the entire surface of the solar capture elements passed through by the atmospheric air.

3. The apparatus according to claim 1, wherein the solar capture elements are in direct contact with the adsorbent material.

4. The apparatus according to claim 1, wherein the valve works solely by pressure differential between the pressure of the atmospheric air in the inner volume and the pressure of the atmospheric air in the outside environment.

5. The apparatus according to claim 1, wherein the upper cover is formed so as to ensure a gravitational flow of the condensed water to the trough.

6. The apparatus according to claim 5, wherein the upper cover comprises at least one planar wall that is inclined relative to the vertical and relative to the horizontal.

7. The apparatus according to claim 1, further comprising: at least two independent absorption and desorption modules placed below a same upper cover.

8. The apparatus according to claim 1, further comprising: a power supply source designed to supply the fan with electricity, the power supply source comprising elements for connecting the apparatus and/or elements to an outside electrical grid in order to produce electricity.

9. The apparatus according to claim 1, wherein the predetermined criteria based on which the electronic control unit places the fan in the operating mode and in the non-operating mode comprise a first time value from which the fan is placed in the operating mode and a second time value from which the fan is placed in a non-operating mode and in that the electronic control unit comprises an internal clock.

10. The apparatus according to claim 1, wherein the solar capture elements comprise a planar support mounted on the lower frame and formed by an assembly of a plurality of hollow beams relative to one another, where all or some of the inner volume of said hollow beams is filled by the absorbent material, each hollow beam being perforated to allow the forced circulation of the atmospheric air through the inner volume of said hollow beams.

11. The apparatus according to claim 10, wherein the support is oriented spatially so as to form an angle with the horizontal of between 5 and 60°.

* * * * *